US008977853B2

(12) United States Patent
Bassu et al.

(10) Patent No.: US 8,977,853 B2
(45) Date of Patent: Mar. 10, 2015

(54) SYSTEM AND METHOD ESTABLISHING TRUSTED RELATIONSHIPS TO ENABLE SECURE EXCHANGE OF PRIVATE INFORMATION

(75) Inventors: Devasis Bassu, Bedminster, NJ (US); Ashish Jain, Bridgewater, NJ (US); Shoshana Loeb, Philadelphia, PA (US); Stan Moyer, Long Valley, NJ (US); Thimios Panagos, Madison, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 240 days.

(21) Appl. No.: 13/198,101

(22) Filed: Aug. 4, 2011

(65) Prior Publication Data
US 2012/0036360 A1 Feb. 9, 2012

Related U.S. Application Data

(60) Provisional application No. 61/371,319, filed on Aug. 6, 2010.

(51) Int. Cl.
*H04L 29/06* (2006.01)
*H04L 9/32* (2006.01)

(52) U.S. Cl.
CPC ............ *H04L 9/3234* (2013.01); *H04L 9/3228* (2013.01); *H04L 2209/56* (2013.01)
USPC .......................................... 713/168; 726/26

(58) Field of Classification Search
USPC ........................................... 713/168; 726/26
See application file for complete search history.

(56) References Cited

U.S. PATENT DOCUMENTS

| 6,253,203 | B1* | 6/2001 | O'Flaherty et al. ................ 1/1 |
| 7,093,286 | B1* | 8/2006 | King ............................. 726/12 |
| 2003/0023726 | A1* | 1/2003 | Rice et al. ..................... 709/225 |
| 2003/0028621 | A1* | 2/2003 | Furlong et al. ................ 709/219 |
| 2003/0088520 | A1* | 5/2003 | Bohrer et al. ................... 705/74 |
| 2004/0064707 | A1* | 4/2004 | McCann et al. ............... 713/185 |
| 2007/0250704 | A1* | 10/2007 | Hallam-Baker ............ 713/156 |
| 2009/0089803 | A1* | 4/2009 | Biggs ........................... 719/318 |
| 2009/0209233 | A1* | 8/2009 | Morrison ..................... 455/411 |
| 2010/0088364 | A1 | 4/2010 | Carter et al. |

OTHER PUBLICATIONS

International Application No. PCT/US2011/046577-PCT International Search Report dated Nov. 21, 2011.

* cited by examiner

*Primary Examiner* — Vikkram Bali
*Assistant Examiner* — Tracy Mangialaschi (57) ABSTRACT

The invention disclosed here is aimed at enabling a trusted third party to manage user opt-ins which would enable growth of personalized information services, that is, enabling trusted business relationships between three types of entities—an end-user, an information source/provider, and an application service provider/developer—so that they can have a controlled, secure and private exchange of sensitive and/or confidential information. The inventive system has modes of operation recommended based on various conditions, enabling a secure exchange of private information between personal information repository owners and application services providers to enable deliver of personalized services. One mode is Durable Subscription Management, which is used when per transaction approval is not needed, that is, when an end-user has given permission to access data for a given or predefined period of time. A second mode is Per-Transaction Subscription Management Without Logs and a third mode is Per-Transaction Subscription Management With Logs.

3 Claims, 9 Drawing Sheets

PRIVITY SYSTEM MANAGES A THREE-WAY TRUST RELATIONSHIP BETWEEN ASPs, INFORMATION OWNERS, AND END USERS

SYSTEM AND METHOD ESTABLISHING TRUSTED RELATIONSHIPS TO ENABLE SECURE EXCHANGE OF PRIVATE INFORMATION

CROSS REFERENCE TO RELATED APPLICATIONS

The present invention claims the benefit of U.S. provisional patent application 61/371,319 filed Aug. 6, 2010, the entire contents and disclosure of which are incorporated herein by reference as if fully set forth herein.

This application is related to commonly-owned, co-pending U.S. patent application Ser. No. 12/652,772 filed on Jan. 6, 2010, the entire contents and disclosure of which is expressly incorporated by reference as if fully set forth herein.

FIELD OF THE INVENTION

This invention relates generally to information analysis, privacy protection and secure repository.

BACKGROUND OF THE INVENTION

Personal and private information about consumers resides in a variety of databases owned by multiple organizations. Value-added service providers would like to access this information for the purpose of offering improved and personalized services to consumers. However, a lack of trust between consumers, information owners, e.g., owners of information sources, and application service providers is preventing the unlocking of the personalization potential.

Currently, trust is managed on a bilateral basis. Information owners do a vetting of the application service providers (ASP), and the ASPs or the information owners provide opt-in mechanisms for users. This requires an ASP to work with each information owner in order to deliver a new service offering the owner's information, a process that significantly increases the business overhead and time to market of innovative services.

Moreover, at present, consumers are wary that ASPs may misuse the information of theirs maintained by and available from information owners. In addition, bilateral agreements between information owners and APSs are time consuming and often impossible when a small ASP is trying to work with a large information owner, e.g., an Information Provider. For example, cell-phone based location determination technology exists today but a small location based ASP cannot offer any value added services incorporating this information because the small provider is not in a position to negotiate with larger mobile communication services providers to obtain the information to share with users.

There are peer-to-peer solutions and protocols for establishment of trust in an open marketplace. Such systems rely on one-to-one interactions to arrive at decisions to support resource exchange. Such systems are concerned with protocols for performing these negotiations and deal with mechanisms for willful or accidental violations of protocols between peer-to-peer exchanges and provide mechanisms for preventing such violations. Moreover, current systems for establishing trusted relationships are based upon brands (for Business to Consumers and Business to Business relationship) or based upon three-way relationships where a broker in between assumes the liability of transactions. Brands take years to develop and broker-based approaches, though suitable for traditional commerce, are unsuitable for establishing fine-grained control in a dynamic open information services' marketplace. For example, a user may use an e-commerce website such as Amazon or ebay® based upon reputation or an online merchant may accept a payment from stranger using a credit guarantor such as visa or mastercard network as broker. Two issues with such arrangements are: (a) the establishment of one-to-one relationships is static and (b) transaction control is coarse grained. Thus, these approaches don't extend to a marketplace model where information owners, end-users, and application service providers create dynamic partnerships and fine-grained controlled over release of information (or equivalently delivery of services) is achieved by taking into account competing preferences of all the participants.

Solutions to the problem of secure exchange of private and/or sensitive information between information owners and ASPs have been focused only on a subset of the four dimensions of trust and on enabling coarse-grained control, e.g., access or no access, to settlements, that is exchanges which occur in response to establishment of trust and transaction of business. This is because these solutions are being offered by either the information owners or the ASPs. Moreover, trust relationships moderated by a third-party work fine for the scenarios they were designed for, but a more open information marketplace requires explicit authorization and fine-grained control to mediate access to confidential and/or sensitive information housed by an information provider/source, that current solutions do not attempt to provide. For instance, the current approaches utilize coarse-grained control over whether you have access to a settlement mechanism or not. There is a need for a technique that constructs a detailed information model for the information provided by each owner/source that enables fine-grained control and can dynamically change permissions over time. Additionally, the ability to input policies, laws, and regulations separately that govern access and behavior is needed.

SUMMARY OF THE INVENTION

The invention disclosed here is aimed at enabling a trusted third party to manage user (end-user) opt-ins which would enable growth of personalized information services, that is, enabling trusted business relationships between three types of entities—an end-user, an information source/provider, and an application service provider/developer—so that they can have a controlled, secure and private exchange of sensitive and/or confidential information. In the inventive approach, fine-grained control is required along with a dynamic, open marketplace of information, so that entities can freely come and go and also evolve in terms of their trust relationship. The inventive system and method, which is workflow based, generates user subscription specific tokens and uses runtime processes to match tokens with specific ASP requests to enforce user opt-in preferences.

An inventive system for establishing trusted business relationships to enable secure exchange of private information comprises a processor, an information provider marketing particular information, a privity core on a processor operable to negotiate between the information provider and one or more application service providers, and a business agreement established between the information provider and the one or more application service providers, the business agreement comprising at least a level of integrity necessary for opt-in to the particular information.

An inventive method for establishing trusted business relationships to enable secure exchange of private information comprises marketing, by an information provider, particular information, negotiating, using a privity core on a processor, between the information provider and one or more application service providers, and establishing a business agreement between the information provider and the one or more application service providers, the business agreement comprising at least a level of integrity necessary for opt-in to the particular information.

An inventive system for secure exchange of private information between personal information repository owners (PIRO) and application services providers (ASPs) to enable delivery of personalized services comprises a privity core operable to generate subscription tokens and manage workflow among the personal information repository owners and the ASPs and an end-user device, at least one privity runtime engine operable to verify ASP requests for user information against the subscription tokens and to encrypt the subscription tokens, an opt-in database storing user preferences, and at least one token database storing the encrypted subscription tokens, wherein when a need to request information occurs, the at least one privity runtime engine retrieves an appropriate token from the subscription tokens stored in an appropriate ASP based on the request for information, decrypts the appropriate token and provides the requested information from the PIRO to the user device via the ASP in accordance with the user preferences. In one aspect, another privity runtime engine receives and decrypts and stores a second token in the PIRO based on the first token and retrieves the appropriate token from an appropriate PIRO when the need to request information occurs An inventive method for secure exchange of private information between personal information repository owners (PIRO) and application services providers (ASPs) to enable delivery of personalized services in accordance with subscription requests, comprises ascertaining a level of trust and establishing secure communication channels between PIRO, ASPs, a privity core and a user device, for each subscription request: initiating, using the privity core, a workflow over the secure communication channels, informing a user of privacy implications and recording user preferences, generating a subscription token and cryptographically embedding data in the subscription token in accordance with the level of trust, receiving and decrypting and storing the subscription token in the ASPs; and when a request for information is received, retrieving an appropriate token from the subscription tokens stored in an appropriate ASP based on the request for information, decrypting the appropriate token and providing the requested information from the PIRO to the user device via the ASP.

In one aspect, the method also comprises receiving and decrypting and storing a second token in the PIRO based on the first token, and retrieving the appropriate token from an appropriate PIRO.

An inventive system for secure exchange of private information between personal information repository owners (PIRO) and application services providers (ASPs) to enable delivery of personalized services comprises a privity core operable to generate subscription tokens and manage workflow among the personal information repository owners and the ASPs and an end-user device, at least one privity runtime engine operable to verify ASP requests for user information against the subscription tokens and to encrypt the subscription tokens, an opt-in database storing user preferences, and at least one token database storing the encrypted subscription tokens, wherein when the privity core receives a data query with user id, the privity core verifies and authenticates the data query and when the data query is authenticated, the privity core generates a one-time token and the ASP decrypts the one-time token and sends the decrypted one-time token to the PIRO, and when the one-time token is valid, the privity core collects a response to the data query from the PIRO and sends the response to the ASP, and the ASP provides the result of the data query to the user device in accordance with the user preferences. In one aspect, a request logging engine logs the request and one-time token and periodically uploads the logged request to the privity core.

An inventive method for secure exchange of private information between personal information repository owners (PIRO) and application services providers (ASPs) to enable delivery of personalized services comprises initiating a workflow over the secure communication channels among PIRO, the ASPs, the privity core and a user device, informing the user of privacy implications, and recording user preferences, generating tokens comprising encrypted data, sending a data query with user id to the privity core, verifying and authenticating the data query in the privity core, and when the data query is authenticated: generating a one-time token, decrypting, at the ASP, the one-time token, sending the decrypted one-time token to the PIRO, when token is valid, collecting a response to the data query from the PIRO and sending the response to the ASP. In one aspect, the method further comprises logging the request and one-time token and periodically uploading the logged request to the privity core.

A computer readable storage medium storing a program of instructions executable by a machine to perform one or more methods described herein also may be provided.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DISCLOSURE

An inventive system and method for secure exchange of personal information is presented. The system, called Privity in this document, determines trust levels between Application Service Providers (APSs) and Information Providers (or Information Owners or Information Source). Privity has at least three modes of operation as described in greater detail below, along with a description of the conditions under which a particular mode is recommended. Different modes help to accommodate differences in trust level and differences in subscription models.

Figure 1:
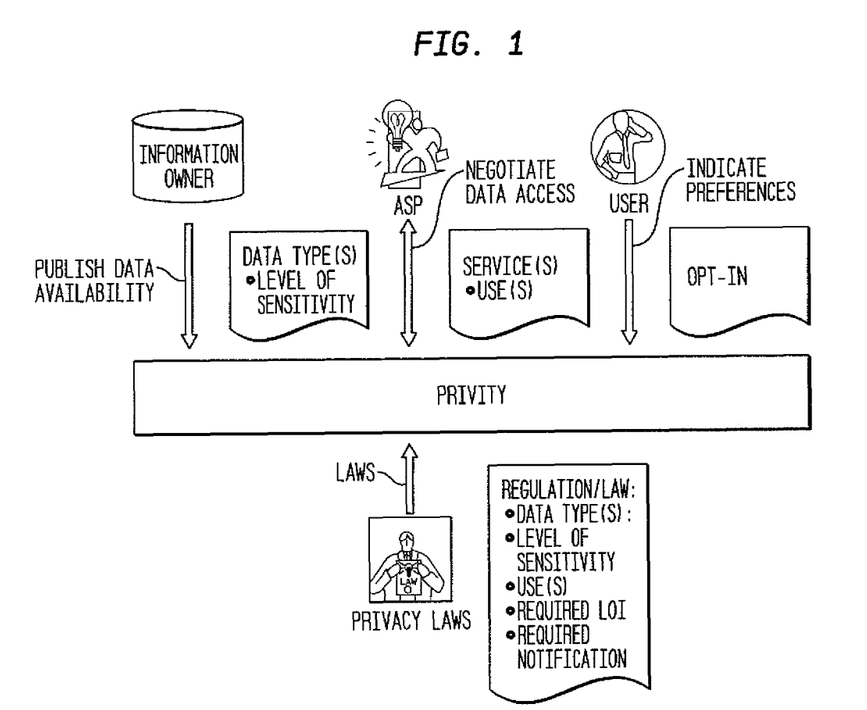
FIG. 1 shows information flows in the inventive system.

Unlike the one-to-one interactions in a peer-to-peer system, the inventive system presented herein is a centralized decisions support system which enforces a global, consistent set of rules across all data exchanges by taking into account preferences of all the parties involved. As depicted in FIG. 1, the parties involved in the novel system are more than just the sender and the receiver and there are no bilateral negotiations between an ASP and Information Owner or Provider. FIG. 1 shows parties can include Information Owner and/or Information Provider, ASP and/or application developer, User or end-user, and privacy laws including regulations regarding features or attributes of data types such as the level of sensitivity, the use(s), the required level of integrity, and required notification.

The authentication verification problem with respect to determining trust levels is presently addressed using crypto-systems. End-user access control conditions are encrypted using Boolean expression over data schema constructs so that an authorization check can be made without having to consult the Privity Core.

The inventive system and method also takes into account various conflicting requirements of releasing personal information and makes a fine-grained determination based upon ASP-information, information owners' requirements, user preferences, and privacy laws related to that information type. The determination of trust level between ASP and Information Owner is performed. Multiple levels of trust are recognized in the following four "dimensions": Level of sensitivity of information; Levels of integrity of (opt-in) end-users; Trustworthiness of ASP; and Quality of Information Provider, based on accuracy and timeliness of data.

Specifically, Level of sensitivity of information enables different types of confidential/sensitive information to be handled in the appropriate manner. This allows less sensitive information to be more easily authorized while still providing the appropriate levels of protection for more sensitive data.

Levels of integrity of (opt-in) end-users promotes trust by assigning a level of confidence to the identity of a person based on the opt-in mechanism(s) used. More flexible opt-in schemes can be supported while still ensuring that highly sensitive information is protected.

Trustworthiness of ASP can be implemented as the feedback from end-users and others in the ecosystem for services and ASPs that provide a deterrent for those who might want to abuse the use of confidential/sensitive information. If the trustworthiness rating goes down enough, the ASP/service could be completely cut-off from access to the data.

Quality of information provider, based on accuracy and timeliness of data as well as ratings through user feedback, is another feedback/rating mechanism that helps to enable an information marketplace as it gives ASPs a way to compare different information providers.

Figure 2:
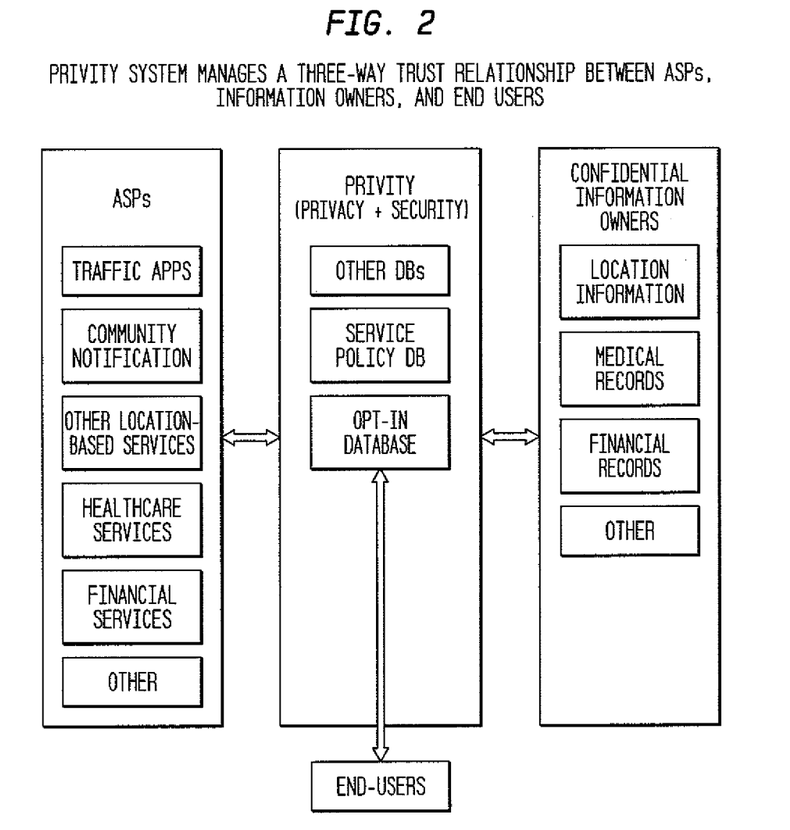
FIG. 2 illustrates managing a three-way trust relationship.
Figure 3:
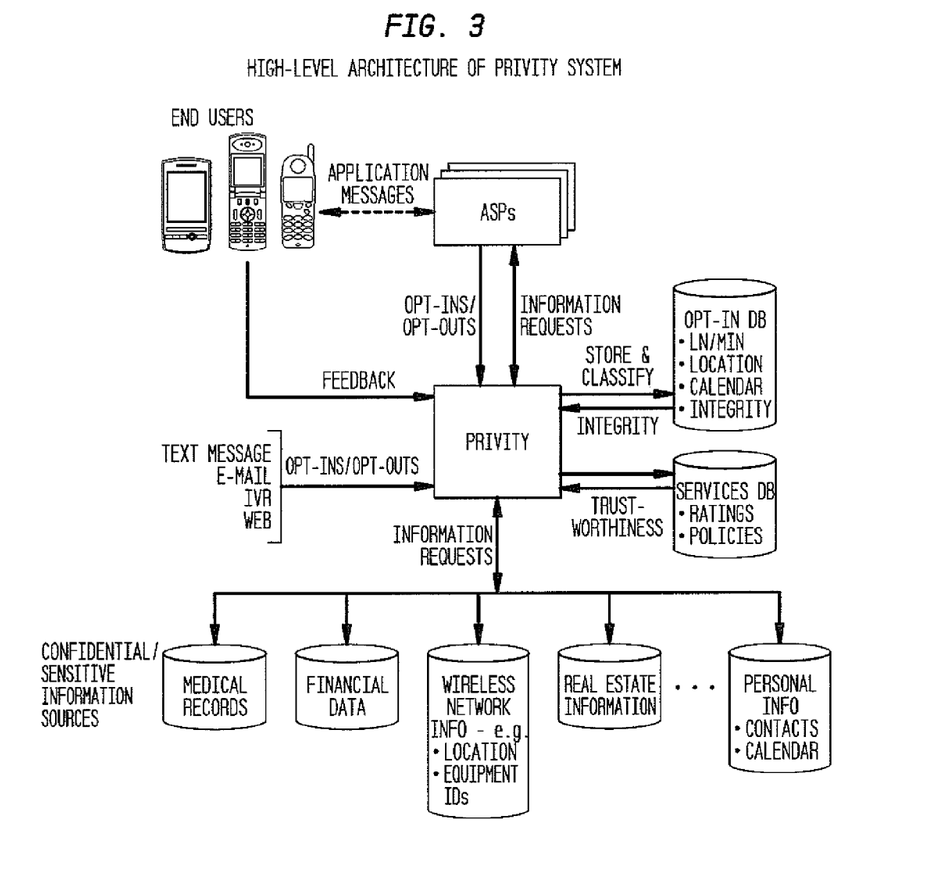
FIG. 3 shows the high level architecture of an embodiment of the inventive system.
Figure 9:
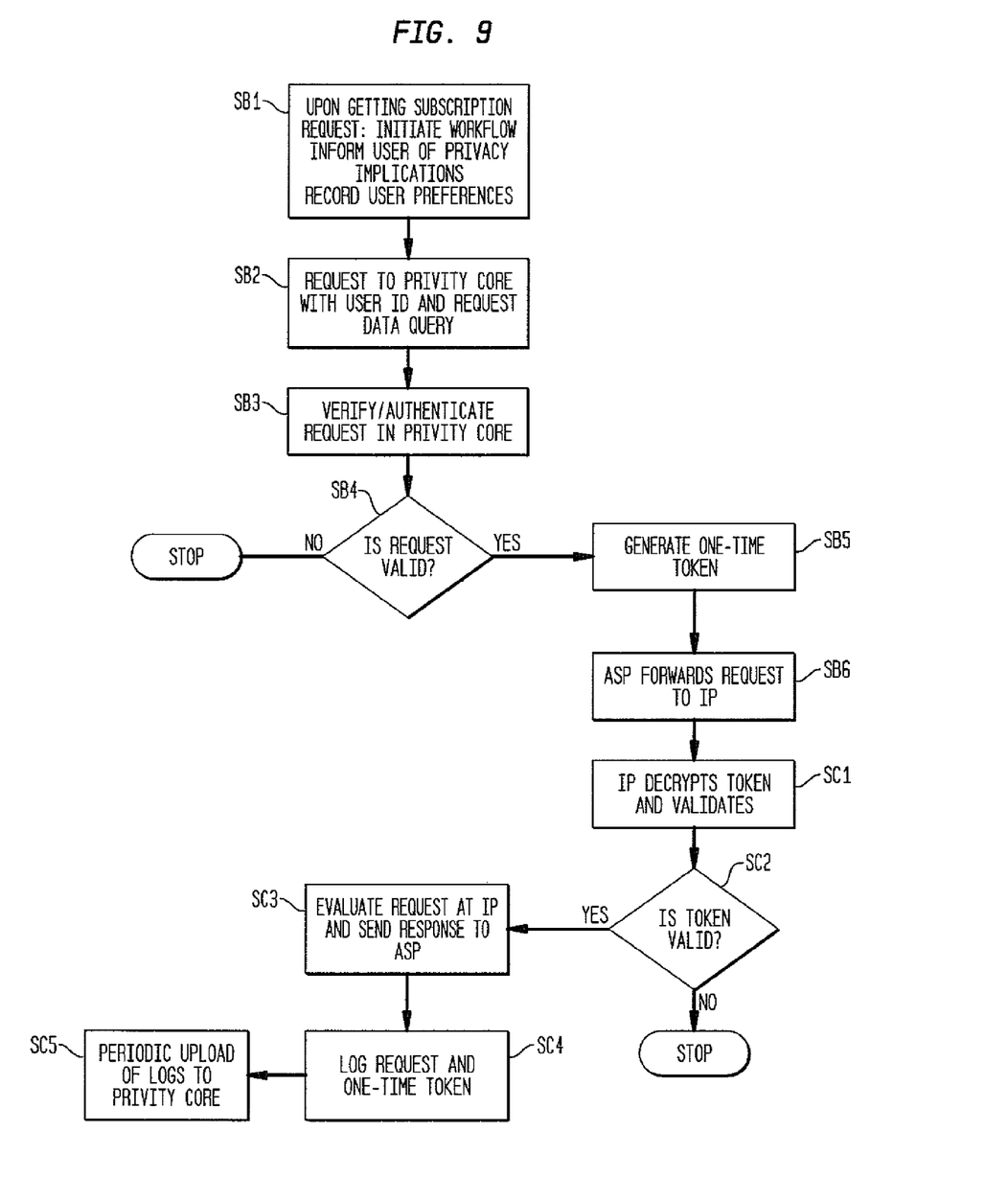
FIG. 9 is a flow diagram of the third embodiment.

FIG. 2 illustrates how Privity manages trust relationships between end-users; application service providers (ASPs), and Infoiuiation Sources/Providers so that end-users can utilize ASP services that require access to confidential/sensitive end-user information that is owned or housed by the information owners/providers. FIG. 9 shows a more detailed high-level architecture of one possible implementation of the Privity system Information Owner 14 publishes to Privity the data model of the information it contains. The data model can be most generically represented as a hierarchical tree structure consisting of nodes and values. Nodes have (data) types and security attributes for describing, for example, level of sensitivity of that data type. Attributes can be multi-level, such as private, public, or conditional. Additionally, Information Owner provides terns of release of this information. Terms may include opt-in required by end-users or opt-out required by end-users. Optionally, additional terms may include information related to pricing.

For example, for a location based service, the information model will consist of geo-coded information tags such as latitude, longitude, altitude, timestamp or geo-decoded information tags such as street address, city, region, or state information. Additionally, there may be tags to specific accuracy levels of the information.

Next, ASP requests access to information. ASP may provide, as part of the request or at an earlier stage, information related to its business. ASP describes the services that it wants to provide (to end-users); this can include the name of the services and the description of uses of (sensitive end-user) information by those services. Privity vets the information and categorizes ASP in one of four categories: trusted-always, trusted-partly, supervised-always, or unfrosted. Optionally, information such as "emergency services provider" may be attached to an ASP.

Trusted-always means that the ASP can directly interface with Information Owner to obtain information. Trusted-partly indicates that part of the information can be released, but other parts are only available with supervised access, e.g., supervised by Privity. Supervised-always indicates that information can be released but has to be supervised by Privity. Finally, Untrusted means information cannot be released.

Irrespective of the category, information can only be released if the end-user's opt-in preferences are met and regulations allow for release of that information. Optionally, ASP may provide pricing information to facilitate brokering and price negotiations.

Next, end-users provide their opt-in/opt-out information based upon type of information, e.g., node attribute as defined in the data model, and ASP trust level, e.g., as defined in ASP category attributes. Optionally, the end-user may indicate additional conditions such as "always release to emergency-services-provider" or "release during working hours and prohibit during non-working hours", etc. The methods by which the end-user opts-in will determine the Level of Integrity (LOI) of the end-user, that is, how much "trust" Privity has that the end-user is who he says he is.

For example, an end-user may have opted to let anyone access his or her region specific release of information, but the end-user may restrict street level information to only ASPs that are "emergency service provider". Additionally, the end-user may have opted-in for "location based ad alerts" from "GAP" application service provider and may allow "GAP" to access information based upon latitude and longitude.

Privacy laws are encoded using Boolean expressions using the same data model attributes as the data model published to Privity by the Information Owner, including data types and levels of sensitivity of the information, the valid (or in-valid) uses of that information that would be specified in the categorization of the ASP, the required LOI of the end-user as described in the end-user's opt-in preferences, and the required notification schedule, that is, how often Privity must notify an end-user that he or she has opted-in for a particular service.

Privity manages a rule-base which reconciles end-user opt-in/opt-out requirements, followed by requirements of the privacy regulations, followed by requirements of the Information Owner. The output of the rule-based system is determination of specific trust-level for an ASP for a specific data-node in the data model tree.

The order of execution of rules is flexible and can be configured manually by Privity based upon the type of information and business arrangements.

A depiction of system operation over the entire lifecycle of the Privity trust management system describes how Privity would typically be used to enable an open market for information exchange.

The management of the trust lifecycle of the three entities is considered as having the following five phases.

Phase I: Pre-approval. In this phase, the following events occur. Establish business relationships, not the service agreements which are discussed below, but master agreement between businesses. These relationships can contain communication between Information Provider (Information Owner) and Privity so that payments can be made. Likewise Privity and each participating ASP must exchange information to establish a business relationship. In addition, supplier "certification" can be performed.

Phase II: Pre-Setup and Business Relationship Management. In this phase, the Information Provider wants to "market" information, that is, to make its information available to ASPs. In addition, one or more ASPs want to access information from the Information Provider. Establishment of business agreements for specific information or services, e.g., between Information Provider and Privity, and between Privity and ASP, can be performed. The Information Provider negotiates with Privity for the type of information it wants to make available and/or offer for "sale" to application providers, and the Information Provider also describes the type of information and the level(s) of sensitivity of that information. An ASP and/or an application developer makes a request to access a type or types of information, and tells Privity what type of service will be utilizing the information. Privity determines if there is an Information Provider offering access to that type of information, and if so, Privity provides the "requirements" for the ASP to access that information; in other words Privitiy provides the Level of Integrity (LOI) that is necessary for an opt-in to the offered information. Note that the steps in this phase could be combined with the steps from Phase I into a single "transaction."

Phase III: Systems Set-up. In this phase, the specific configuration information required for a service (as specified by the ASP) is determined, and provided to the appropriate parties. Some examples of the information that is needed are the specific opt-in information, e.g., URLs for web opt-ins, shortcodes for text message opt-ins, and the notification schedule, that is, how often an end-user should be reminded that he or she has opted in for a particular service. The billing can be activated in this phase. In addition, the service is tested to verify that it work as specified, e.g., that an ASP can access information for which it has been authorized and that it cannot access information for which it is not authorized. If the Privity system supports different opt-in methods (direct and/or indirect), then they all will be tested.

Phase IV: Runtime. In this phase, end-user to ASP processing is performed, including process opt-ins, process requests, and credential delegation approach, e.g., tokens and one-time tokens, discussed above.

Phase V: Monitoring and Maintenance. This phase includes Auditing, Updates, e.g., ASP service modification requests, Monitoring ASP and service feedback with varying penalties, e.g., rate-limiting vs. revocation, revocation both of Information Providers and of ASPs. In this phase, updates to services and information sources and revocation of "trust" for any entity (ASP, Information Owner/Provider, or end-user) are handled. Additionally, feedback on ASPs and Information Providers along with auditing of both is part of this phase.

An example of the on-going use of Privity is as follows. Suppose an Information Provider collects and/or maintains information about an end-user's location. Also suppose an ASP offers a service providing traffic information. An end-user who is driving in his car may be interested in receiving traffic information related to his current location. Thus the end-user would like to combine his location information with traffic information. Using Privity, the end-user gives approval, either one-time or for a specific duration, to the Information Provider, to provide the end-user with traffic information from the ASP based on the end-user's location as known to the Information Provider. Hence if the end-user is stuck in traffic, he can get relevant traffic information related to his location without having to sort through unrelated information. Both the ASP and the Information Provider successfully offer a needed service that provides value to the end-user.

As mentioned above, Privity has at least three modes of operation; each particular mode is recommended based on various conditions. These different modes help to accommodate differences in trust level and differences in subscription models.

A first mode or embodiment of Privity is Durable Subscription Management. This mode is used when per transaction approval is not needed, that is, when an end-user has given permission to access data for a given or predefined period of time. For example, the end-user may have given approval for ASP's use of certain personal information for a pre-defined duration, e.g., day, month, year, or for a specific expiration date, or when there is high level of trust between ASP and Privity.

This is an embodiment of the system in which it was determined in the pre-verification stages that the fine-gained controlled can be achieved using durable subscription. Privity makes a determination as to how the information flow would occur during actual transactions based upon variety of inputs, as shown in FIG. 1.

Figure 4:
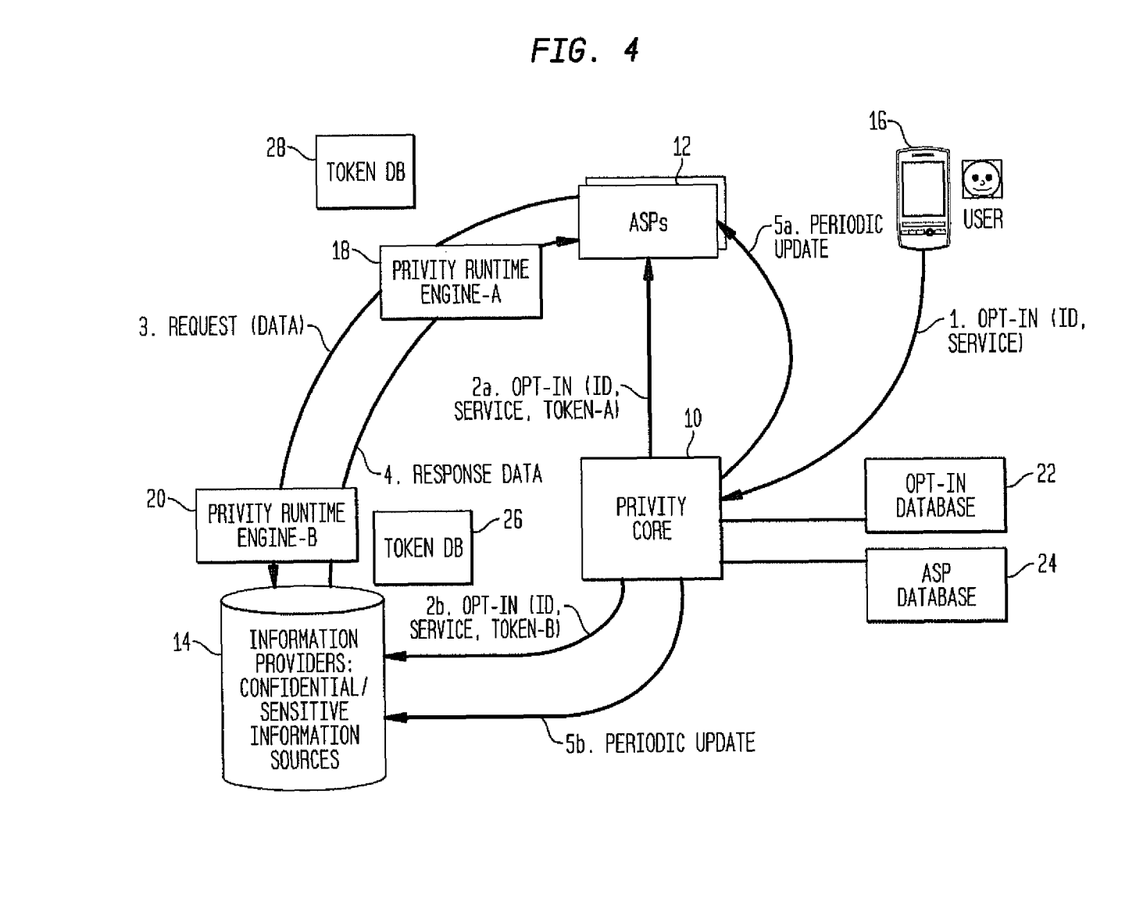
FIG. 4 is a schematic diagram of an embodiment of the inventive system.

Privity specific components for this mode are shown in FIG. 4, and can include the following. Privity Core 10 is the core module which is used to generate subscription tokens and manage the workflow between ASPs 12, owners of sources of information, e.g., Information Source systems or Information Providers 14, and devices, e.g., mobile phones, laptops, tablets, etc., of users of the system (end-users) 16. The Privity Runtime Engines A and B 18, 20 are used for verification of ASP 12 requests for user information against subscription tokens. In some embodiments, only one Privity Runtime Engine 18 is used. Opt-In Database 22 can be used for storing user opt-in subscription information. The subscription information includes attributes such as expiration/renewal, portion of personal information that is made available to an ASP, and additional conditions for sharing this information such as day, date and/or time. ASP Database 24 contains ASP related information including the cryptographic key information needed by Privity Core 10. The token databases, Token DB-A and Token DB-B 26, 28 contain tokens, such as token-a and token-b, which are created and/or verified by PRE-A 18 and/or PRE-B 20.

As shown in FIG. 4, the Durable Subscription mode requires Privity Runtime Engine A (PRE-A) 18 and Privity Runtime Engine B (PRE-B) 20 to be installed and integrated with ASPs 12 and Information Providers 14. At or about the time of expiration, which can be a system configurable parameter, Privity core 10 can inform the end-user of a pending expiration, and may renew an end-user's subscription to the service in accordance with his or her directions.

The following steps are used to deliver the Durable Subscription Management service. Setup Step: During the setup step, Privity Core initiates discussion with an ASP to ascertain the level of trust of the systems. Both the ASP and Information Providers are configured to run Privity Runtime Engines A and B (PRE-A and PRE-B). All the communication channels are secure and authenticated and not subject to eavesdropping. Note that there are several known mechanisms for ensuring secure communications, including private links, IP Sec tunnels, SSL connections, Network or Application layer Virtual Private Network Links, Secure Shell (SSH), and HTTPS. In one embodiment of this invention, security is achieved using the HyperText Transmission Protocol, Secure (HTTPS) protocol, and PKI (Public Key Infrastructure) is used for authentication.

The following steps are shown with arrows in FIG. 4. Step 1: Upon getting a subscription request with appropriate access control preferences from the end-user, Privity Core interfaces with the end-user to initiate a workflow and a dialog to inform the end-user of privacy implications, and records his or her user preferences in the Opt-In database 22 and the ASP database 24.

Steps 2a and 2b: Privity core uses the user preferences to generate two tokens, token-a and token-b, to be used for validations by PRE-A 18 and PRE-B 20, respectively. Token-a cryptographically embeds the user id, ASP related attributes, access-control preferences, and expiration information. The cryptographic embedding is done such that 1) the token is meant for the specific ASP only, 2) PRE-A can verify that the token was generated by Privity Core and not tampered with, 3) PRE-A can verify that the token was provided by the ASP for which the token was initially generated. To achieve this, token-a's contents are first encrypted using the Public Key of PRE-A, followed by the Public Key of ASP, followed by the Private Key of Privity Core.

The access-control information contains the following. One embodiment assumes a normative representation of the data model using XML Schema, described, for example, in W3C XML Schema specifications. XML schema is a tree structure and access-control preferences are specified using Boolean expressions involving the entities and attributes in the schema tree, as well as primitive entities such as date, day, time, ASP-type, ASP-Trust-Level, Query-Name, etc. The list of primitive attributes is extensible. One example of an access-control expression for a particular user may be:

IF ASP-type='emergency services' and Query-Name='urgent' then ALLOW (Location-Information, Allergy-Information) and Never-Expire=True.

In this example, an ASP is pre-qualified to send urgent emergency related queries to obtain Location-Information and Allergy-Information for this user, and this permission does not expire (as long as ASP credentials are not revoked).

A second example may be:

IF ASP-type='healthcare provider' then ALLOW (Entity.Attribute='Private' and 'Clinical') and Never-Expire=True.

In this second example, all data entities which are marked 'Private' and 'Clinical' are allowed to be released to a healthcare provider ASP.

Generation of token-b is an optional step used as a fail-safe mechanism to guard against a compromised PRE-A or a compromised ASP. Token-b contains the same information as token-a but is encrypted differently. Token-b is generated by encrypting first using the Public Key of PRE-B, followed by the Public Key of the Information Provider, and then followed by Privity Core's private key.

Step 2a. Upon receiving token-a from Privity Core, ASP decrypts the token using Privity Core's public key, followed by its own private key, and passes the token to PRE-A. PRE-A stores the token in its token database 28.

Step 2b. Upon receiving token-b from Privity Core, information Provider decrypts the token using Privity Core's public key, followed by its own private key and passes the token to PRE-B. PRE-B stores the token its token database 26.

Step 3. Upon needing to request information for a particular user, PRE-A retrieves the appropriate token-a for that user from the database, decrypts the token using its private key and validates the request against the token content; that is, PRE-A evaluates the Boolean conditions embedded in the token, and if successful, forwards the request to PRE-B.

Step 4. Note the assumption that PRE-A and PRE-B are communicating on an authenticated and secure channel. Upon receiving the request for information from PRE-A, PRE-B retrieves the appropriate token-b from its token database 26, decrypts token-b using its private key to obtain ASP-Trust-Level information, and if needed, re-performs the validation using token-b. If successful, PRE-B collects the response, encrypts it, and sends it to PRE-A using the secure channel.

Step 5. This is a maintenance step. As part of token management, periodically or upon requests from PRE and/or Privity Core, updates to the token database(s) may be sent. For example, one way to do revocation of tokens is by sending new tokens to PRE-A and PRE-B and encoding new token-b such that PRE-B is forced to re-validate (fail-safe mechanism) all validations coming from PRE-A for that subscription.

Figure 5:
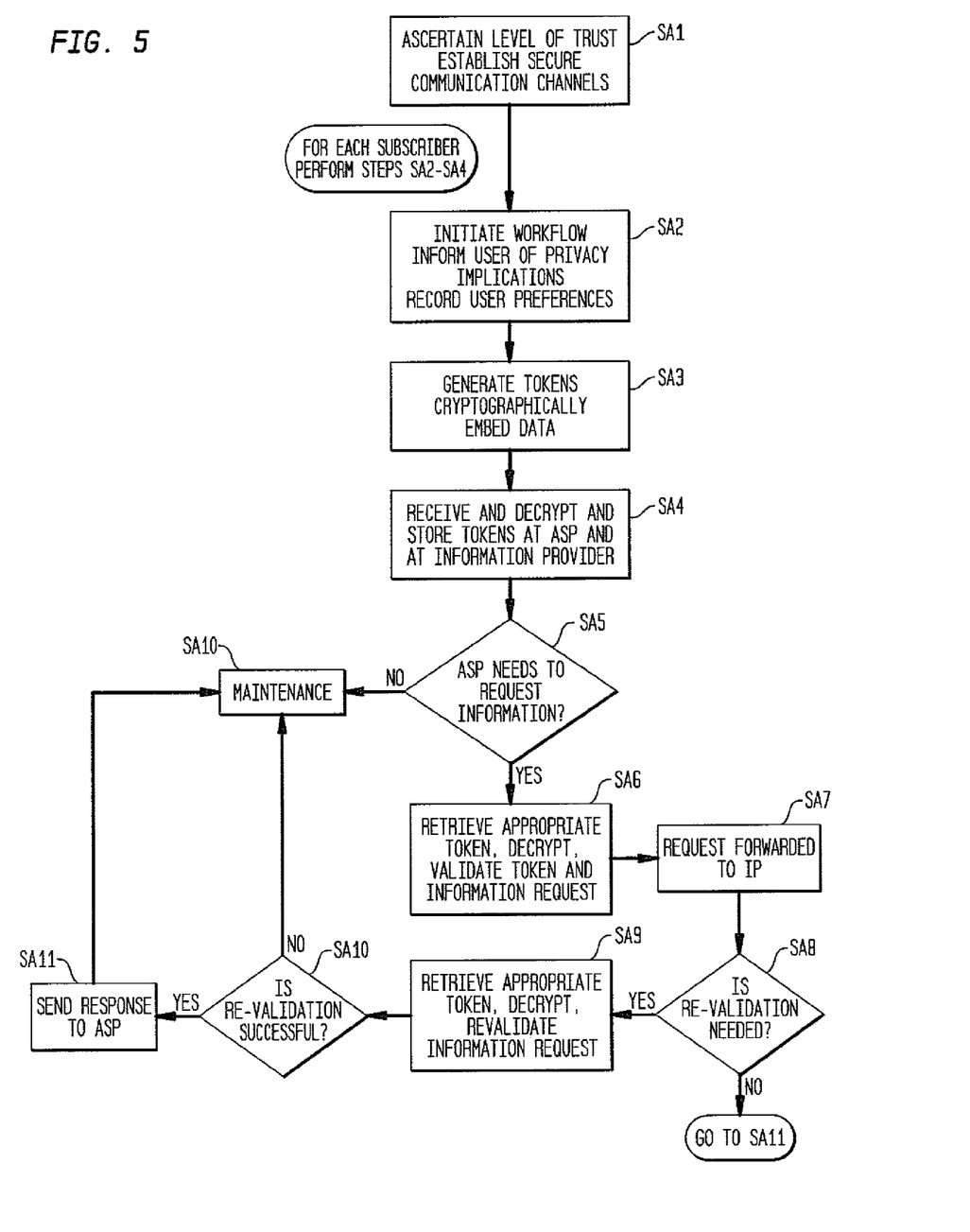
FIG. 5 is a flow diagram of an embodiment of the inventive method

FIG. 5 shows a flow diagram of the Durable Subscription Management mode of the Privity System. In step SA1, ascertain the level of trust and establish secure and authenticated communication channels between Privity Core, ASP and Information Provider(s).

Steps SA2-SA4 are performed for each subscriber or end-user subscription, enabling a user to opt-in to the system. In step SA2, initiate workflow, establish secure and authenticated communication channel between user device and Privity Core, inform user of privacy implications and record user preferences. In step SA3, Privity Core generates tokens for validations and cryptographically embeds data in encrypted tokens. In step SA4, receive and decrypt and store tokens in the token database associated with the ASP. In addition, receive and decrypt and store tokens in the token database associated with the Information Provider.

In step SA5, ASP determines whether a request for information is needed and initiates a request; if ASP desires to initiate a request for data or information, (SA5=YES), in step SA6, ASP retrieves the appropriate token, e.g., one associated with the information, stored in step SA4, decrypts and validates the token and the information request.

In step SA7, ASP sends the validated request to the Information Provider that may also re-validate the received request (as a failsafe mechanism) using PRE-B and the appropriate token-b in its database. If re-validation is desired (SA8=YES), then, in step SA9, IP retrieves the appropriate token, e.g., token-b, decrypts the token and revalidates the information request. If the revalidation is successful (SA10=YES), then at step SA11, the Information Provider sends the information to ASP that forwards requested information to the requester (end-user). Return to step SA5.

If there is no request for information (SA5=NO), maintenance can be performed in step SA10. If re-valuation is not needed (SA8=NO), the process continues at SA11. If re-valuation is not successful (SA10=NO), maintenance can be performed in step SA10.

A second embodiment or mode is Per-Transaction Subscription Management Without Logs. This mode requires that Privity Runtime Engine (PRE) 18 be integrated only with the Information Providers 14. This mode is used when ASP is offering a service that requires per-ransaction approval. This is an embodiment in which it was determined that fine-coarse control requires that ASP send every request for information to Privity for authorization before forwarding the request to the Information Provider.

Figure 6:
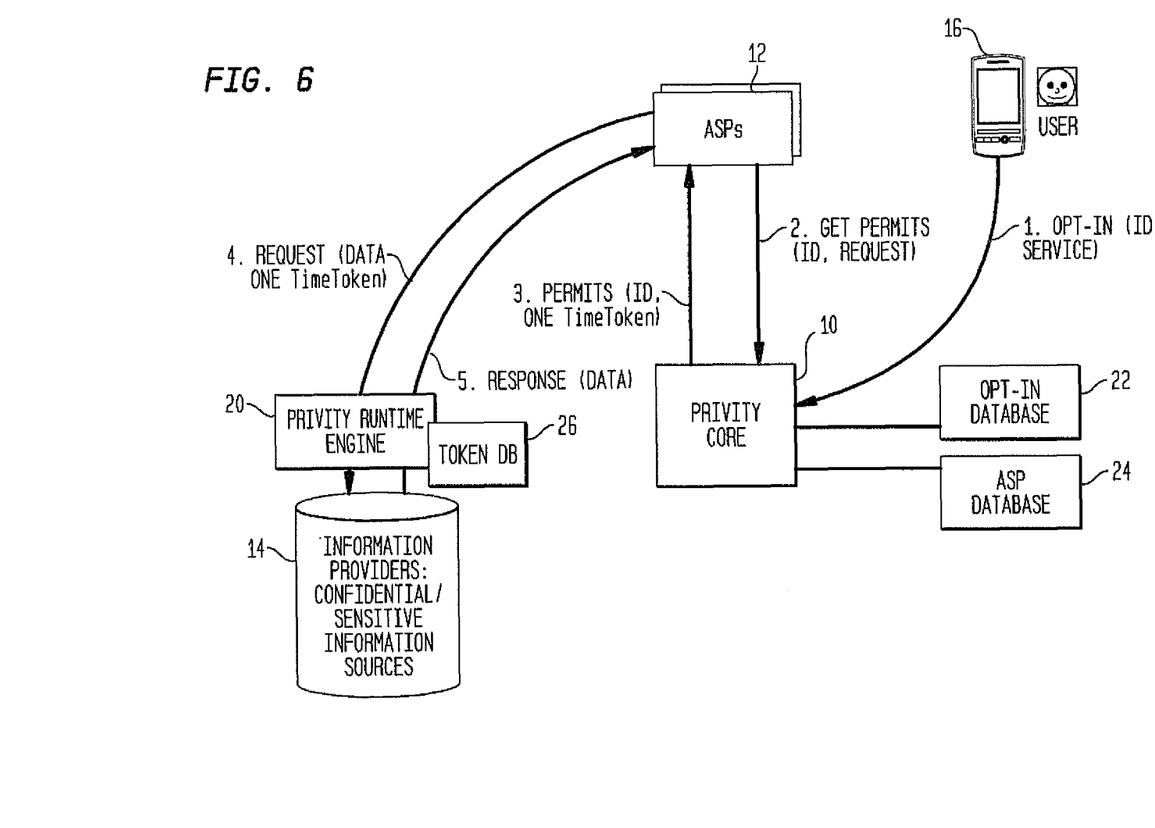
FIG. 6 is a schematic diagram of a second embodiment of the inventive system.

Privity specific components for this mode are shown in FIG. 6, and can include several, but not all, of the modules shown in FIG. 4. In particular, this Per-Transaction Subscription Management Without Logs mode comprises the following components: Privity Core 10, ASPs 12, Information Providers 14, devices of users of the system (end-users) 16, Privity Runtime Engine 18, Opt-In Database 22, ASP Database 24 and Token DB 26.

The following steps are used by the Privity system to deliver the Per-Transaction Subscription Management Without Logs service. Steps 1-5 are shown with arrows in FIG. 6. Setup Step: During the setup step, Privity Core initiates communication and discussion with an ASP to ascertain the level of trust and compliance of the systems and/or services provided by the ASP. Based on the results of these discussions, the ASP is authorized to request from Privity Core permission to access a user's personal data anytime there is a need to do so. It is assumed that Information Providers are configured to run Privity Runtime Engine (PRE). All the communication channels are secure and authenticated and not subject to eavesdropping. As with the first mode, there are several known mechanisms to ensure secure communications, discussed above.

Step 1: Upon getting a subscription request with appropriate access control preferences from the user, Privity Core interfaces with the user to initiate a workflow and a dialog to inform the user of privacy implications, and records user preferences.

Step 2: When the authorized ASP needs to access a user's personal information, it forwards that request to Privity Core with user id and request query data.

Step 3: Privity Core verifies that the request is authorized by the user by evaluating the access-control conditions locally, and if successful, generates a one-time token by encrypting the request and the current timestamp. The encryption should be such that 1) the token is meant for the specific, authorized ASP only, 2) PRE can verify that the token was generated by Privity Core and not tampered with, 3) PRE can verify that the token was provided by the authorized ASP for which the token was initially generated and not tampered with. To achieve this, Privity Core encrypts the token with PRE public key, followed by the ASP-public key, followed by the Privity Core private key. Privity Core sends the encrypted one-time token to the ASP.

Step 4: The authorized ASP decrypts the token using Privity Core's public key, followed by the ASP's private key. The resulting token and the original request are sent to PRE at Information Provider.

Step 5: PRE verifies the validity of the one-time token by first decrypting it using its private key to obtain the timestamp and original request embedded in the token. If the embedded request matches the request sent the authorized ASP and the timestamp is with certain duration, which can be a configurable parameter of the system, the request is forwarded to Information Provider owning the information and PRE collects the response. The response is sent to the authorized ASP.

Figure 7:
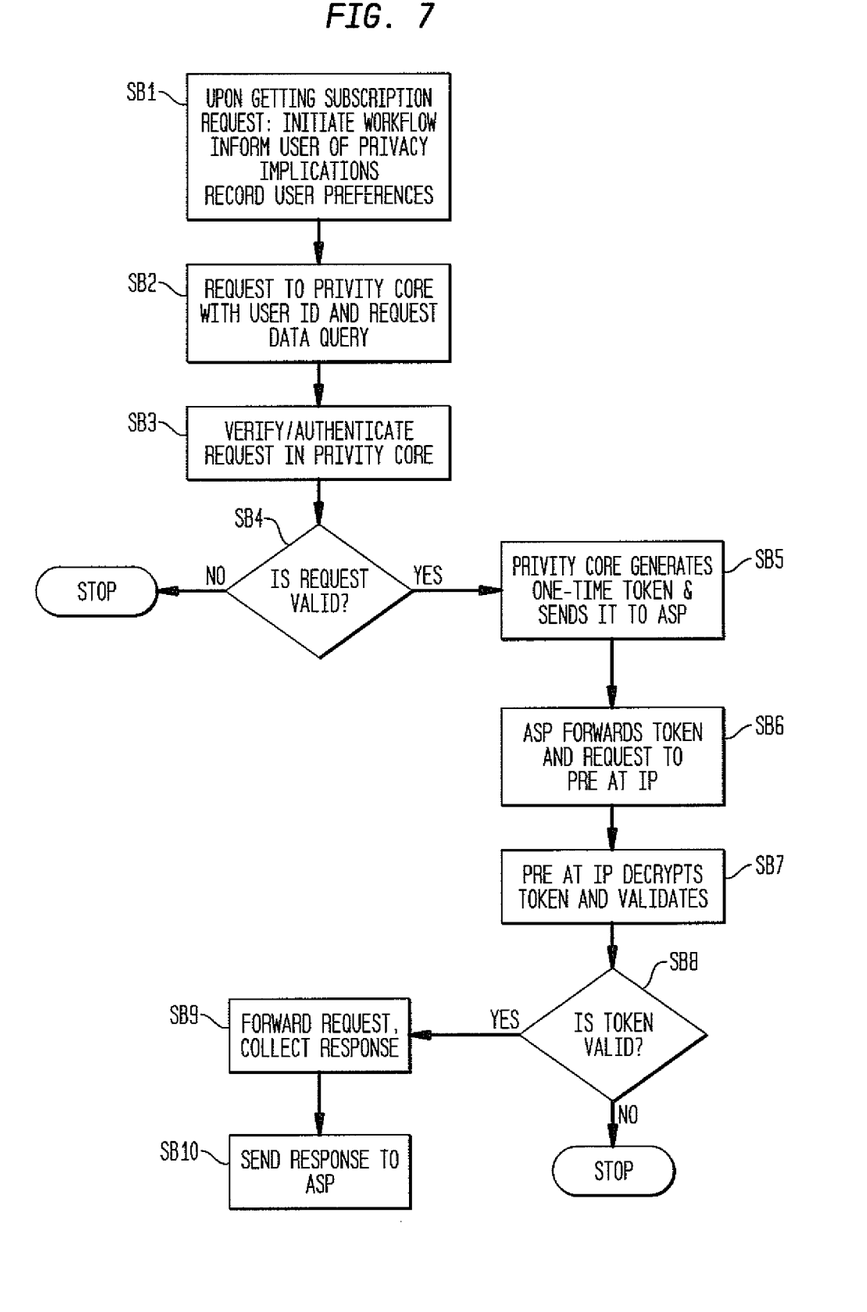
FIG. 7 is a flow diagram of the second embodiment.

FIG. 7 is a flow diagram of the second mode which is Per-Transaction Subscription Management Without Logs. In step SB1, upon getting a subscription request, Privity Core initiates workflow, informs the user of privacy implications and records user preferences. In step SB2, authorized ASP forwards the request for user's personal information to Privity Core with user id and request query data. In step SB3, Privity Core verifies and/or authenticates the request. If request is valid (SB4=YES), then, in step SB5, Privity Core generates a one-time token by encryption of PRE public key, ASP public key, Privity Core private key, and sends this one-time token to ASP. In step SB6, ASP forwards the token and sends it and original request to PRE at Information Provider. In step SB7, the PRE of the Information Provider decrypts and validates the one-time token. In step SB8, if the one-time token is valid (SB8=YES), then in step SB9, PRE forwards the request to Information Provider and collects the response. In step SB10, this authorized response is sent to the authorized ASP.

If the request is not valid (SB4=NO), processing stops. Further, if the one-time token is not valid (SB8=NO), processing stops.

A third mode is Per-Transaction Subscription Management With Logs. This mode requires no installation of Privity Runtime Engine (PRE); however, it requires that Privity Request Logging Engine 28 be installed at the Information Provider. This is an embodiment in which it was determined that AST will proxy every request to Privity and Privity will also use offline logs for double verification that information is being released appropriately.

Figure 8:
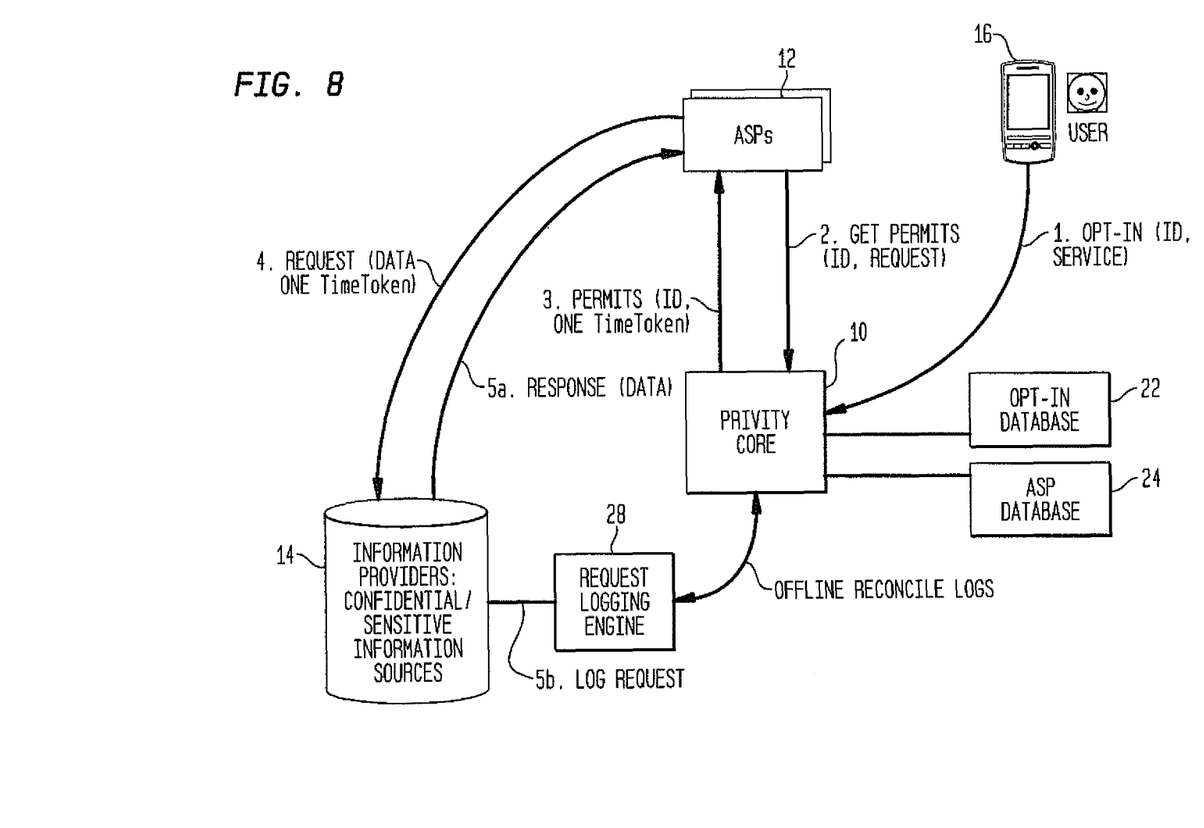
FIG. 8 is a schematic diagram of a third embodiment of the inventive system.

As shown in FIG. 8, the system in this embodiment comprises the following components, many of which are shown in FIG. 4 and described above. In particular, this Per-Transaction Subscription Management With Logs mode comprises the following components: Privity Core 10, ASPs 12, Information Providers 14, devices of users of the system (end-users) 16, Privity Runtime Engine 18, Opt-In Database 22, and ASP Database 24. In addition, a Request Logging Engine 28 can be used for logging in the request the Information Providers 14 receive from ASPs; the logged in requests can be used for auditing purposes.

The Per-Transaction Subscription Management With Logs service employs several of the same steps as the Per-Transaction Subscription Management Without Logs mode. For example, the Setup Step, is the same except that the Information Providers are configured to run Privity Request Logging Engine, not PRE. As with the above described modes, all the communication channels are secure and authenticated and not subject to eavesdropping, and several mechanisms are known and employed to ensure these secure communications, as discussed above.

Steps 1, 2, 3, 4 are the same in both the second and third modes. These steps are shown with arrows in FIGS. 6 and 8.

Step 5a: The Information Provider has an Information Source Owner System (not shown); the Information Provider evaluates the request and sends the response to ASP. Step 5b: The Information Source Owner System logs the request and the one-time token into a logging facility. These logs are periodically uploaded into the Privity Core where they are matched for generating compliance reports.

FIG. 9 is a flow diagram of the third mode which is Per-Transaction Subscription Management Without Logs. Steps SB1-SB6 are the same as shown in FIG. 7, and described above. In step SC1, the Information Provider decrypts and verifies validity of the one-time token. If the one-time token is valid (SC2=YES), then in step SC3, the Information Provider evaluates the request and sends the response to ASP. In step SC4, the Information Source Owner System logs the request and the one-time token into a logging facility. In step SC5, the logs are periodically uploaded to the Privity Core for compliance reports.

If the one-time token is not valid (SC2=NO), processing stops.

Unlike current systems, the present invention uses a clearinghouse or trusted third party to provide secure exchange of personal information. Hence, the technique is flexible to accommodate subscriber specific constraints. In addition the technique can accommodate subscriber specific constraints on a subset of personal information. Further, the technique allows for durable subscriptions, and allows for a mechanism to support per transaction verification.

Advantageously, the novel system obviates the need for each information provider and services provider to have a bilateral agreement. In addition, the system beneficially provides a crypto-secure mechanism to thwart violations of trust, with fail-safe mechanisms to actively and passively monitor ASPs. The inventive technique scales and performs better than prior solutions because the complex authorization checks based upon end-user access control preferences can be performed locally at ASPs or Information Owners without having to consult the Privity core.

Additional advantages include the following. The novel solution utilizes multiple levels of trust and also supports four dimensions of trust, discussed above. In addition, the fine-grained control of the information enables different policies to be set by the end-user so that, for example, location information can be used by a family-friend finder application but not by a mobile marketing service. Additionally, the ability for the model and the system to capture the dynamic nature of trust enables the ability to track changes in security and privacy laws and regulations and changes in reputations of the entities involved. For example, a more trusted service may have access to a specific user's medical records, but a less-trusted service of the same type may not. Beneficially, the inventive system captures the dynamic nature of trust relationships that evolve over time as conditions and reputations change.

Various aspects of the present disclosure may be embodied as a program, software, or computer instructions embodied or stored in a computer or machine usable or readable medium, which causes the computer or machine to perform the steps of the method when executed on the computer, processor, and/or machine. A program storage device readable by a machine, e.g., a computer readable medium, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc. The system also may be implemented on a virtual computer system, colloquially known as a cloud.

The computer readable medium could be a computer readable storage medium or a computer readable signal medium. Regarding a computer readable storage medium, it may be, for example, a magnetic, optical, electronic, electromagnetic, infrared, or semiconductor system, apparatus, or device, or any suitable combination of the foregoing; however, the computer readable storage medium is not limited to these examples. Additional particular examples of the computer readable storage medium can include: a portable computer diskette, a hard disk, a magnetic storage device, a portable compact disc read-only memory (CD-ROM), a random access memory (RAM), a read-only memory (ROM), an erasable programmable read-only memory (EPROM or Flash memory), an electrical connection having one or more wires, an optical fiber, an optical storage device, or any appropriate combination of the foregoing; however, the computer readable storage medium is also not limited to these examples. Any tangible medium that can contain, or store a program for use by or in connection with an instruction execution system, apparatus, or device could be a computer readable storage medium.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server, and network of servers (cloud). A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims

What is claimed is:

1. A system for secure exchange of private information between a personal information repository owner (PIRO) and an application services provider (ASP) to enable delivery of a personalized service to an end-user device, the system comprising:
    a trusted third-party privity core on a processor, wherein the trusted third-party privity core is in communication with the PIRO, the ASP, and the end-user device; and
    a privity runtime engine in communication with the trusted third-party privity core, the PIRO, and the ASP;
    wherein the trusted third-party privity core:
        stores a level of trustworthiness for the ASP;
        stores rules regulating dissemination of different types of private information:
        receives an opt-in message from the end-user device indicating a request to receive a service provided by the ASP;
        receives from the ASP, a request for private information of the end-user device needed for providing the requested service;
        determines whether the requested private information can be provided to the ASP based on the level of trustworthiness for the ASP, the rules regulating dissemination of the requested private information, and the opt-in message from the end-user device;
        generates a one-time subscription token that includes the received request for private information;
        stores the token in a token database accessible by the privity runtime engine;
        encrypts the token; and
        sends the encrypted one-time token to the ASP upon determining that the requested private information can be provided to the ASP;
    wherein the ASP decrypts the encrypted one-time token and sends the token and the request for private information to the privity runtime engine; and
    wherein the privity runtime engine:

receives the token and the request for private information from the ASP;

verifies the token is valid and the request for private information matches the request sent from the privity core to the ASP; and upon verification of the token and the request, obtains the requested private information from the PIRO and sends the requested private information to the ASP.

2. A method of securely exchanging private information between a personal information repository owner (PIRO) and an application services provider (ASP) to enable delivery of a personalized service to an end-user device, wherein a trusted third-party privity core on a processor is in communication with the PIRO, the ASP, and the end-user device, and a privity runtime engine is in communication with the trusted third-party privity core, the PIRO, and the ASP, wherein the method comprises:

performing the following steps by the trusted third-party privity core on a processor:
storing a level of trustworthiness for the ASP;
storing rules regulating dissemination of different types of private information;
receiving from the end-user device, an opt-in message that indicates a request to receive a service provided by the ASP;
receiving from the ASP, a request for private information of the end-user device needed for providing the requested service;
determining whether the requested private information can be provided to the ASP based on the level of trustworthiness for the ASP, the rules regulating dissemination of the requested private information, and the opt-in message from the end-user device;
generating a one-time subscription token that includes the received request for private information;
storing the token in a token database accessible by the privity runtime engine;
encrypting the token; and
sending the encrypted one-time token to the ASP upon determining that the requested private information can be provided to the ASP;

performing the following steps by the ASP:
decrypting the encrypted one-time token; and
sending the token and the request for private information to the privity runtime engine; and performing the following steps by the privity runtime engine:
receiving the token and the request for private information from the ASP;
verifying the token is valid;
verifying the request for private information matches the request sent from the privity core to the ASP; and
upon verification of the token and the request, obtaining the requested private information from the PIRO and sending the requested private information to the ASP.

3. A non-transitory computer-readable storage medium storing a program of instructions executable by a machine to perform a method of securely exchanging private information between a personal information repository owner (PIRO) and an application services provider (ASP), wherein a trusted third-party privity core on a processor is in communication with the PIRO, the ASP, and an end-user device, and a privity runtime engine is in communication with the trusted third-party privity core, the PIRO, and the ASP, wherein the method comprises:

performing the following steps by the trusted third-party privity core on the processor:
storing a level of trustworthiness for the ASP;
storing rules regulating dissemination of different types of private information;
receiving from the end-user device, an opt-in message that indicates a request to receive a service provided by the ASP;
receiving from the ASP, a request for private information of the end-user device needed for providing the requested service;
determining whether the requested private information can be provided to the ASP based on the level of trustworthiness for the ASP, the rules regulating dissemination of the requested private information, and the opt-in message from the end-user device;
generating a one-time subscription token that includes the received request for private information;
storing the token in a token database accessible by the privity runtime engine;
encrypting the token; and
sending the encrypted one-time token to the ASP upon determining that the requested private information can be provided to the ASP;

performing the following steps by the ASP:
decrypting the encrypted one-time token; and
sending the token and the request for private information to the privity runtime engine; and performing the following steps by the privity runtime engine:
receiving the token and the request for private information from the ASP;
verifying the token is valid;
verifying the request for private information matches the request sent from the privity core to the ASP; and
upon verification of the token and the request, obtaining the requested private information from the PIRO and sending the requested private information to the ASP.

* * * * *

UNITED STATES PATENT AND TRADEMARK OFFICE
CERTIFICATE OF CORRECTION

| | |
|---|---|
| PATENT NO. | : 8,977,853 B2 |
| APPLICATION NO. | : 13/198101 |
| DATED | : March 10, 2015 |
| INVENTOR(S) | : Bassu et al. |

It is certified that error appears in the above-identified patent and that said Letters Patent is hereby corrected as shown below:

In the Specification

In Column 5, Line 54, delete "Infoiuiation" and insert -- Information --, therefor.

In Column 5, Line 67, delete "terns of" and insert -- terms of --, therefor.

In Column 6, Line 17, delete "unfrosted." and insert -- untrusted. --, therefor.

In Column 10, Line 59, delete "requester" and insert -- requestor --, therefor.

In Column 11, Line 2, delete "per-ransaction" and insert -- per-transaction --, therefor.

In Column 14, Line 28, delete "claims" and insert -- claims. --, therefor.

Signed and Sealed this
Twentieth Day of October, 2015

Michelle K. Lee
*Director of the United States Patent and Trademark Office*